INVENTORS.
JOHN C. FAGAN
ROBERT L. BILLINGSLEY
BY Hume, Clement, Hume & Lee
Attorneys.

United States Patent Office 3,606,117
Patented Sept. 20, 1971

3,606,117
MATERIAL POSITIONING CONTROL
John C. Fagan, Oaklawn, and Robert L. Billingsley, Hazel Crest, Ill., assignors to Amtron, Inc., Midlothian, Ill.
Filed Feb. 27, 1970, Ser. No. 14,951
Int. Cl. B65h, 23/18
U.S. Cl. 226—2
16 Claims

ABSTRACT OF THE DISCLOSURE

There is disclosed a method and a control system for carrying out the method for feeding a preselected length of material to a utilization device in a minimum feed time comprising the steps of: accelerating the feed rate of said material from an initial first feed velocity, for example, zero velocity, to a second feed velocity, for example, a preselected maximum feed velocity; providing a first signal to a first storage means wherein the first signal is indicative of the actual length of the material being fed; providing a second signal during the acceleration to the first storage means and to a second storage means wherein the second signal is indicative of the total length of material that would have been fed during the acceleration period if said feed rate had accelerated from the first feed velocity to the second feed velocity instantaneously; disconnecting the second signal from the first and second storage means and applying the first signal to the second storage means when the difference in magnitude of the first and second signals stored in the first storage means is equal to the amount of material which will be fed during deceleration from the second feed velocity to the first feed velocity, wherein the second storage means adds the first signal to the previously provided second signal until the total magnitude of the signals stored in the second storage means is indicative of the preselected length to be fed; and decelerating the feed rate from the second feed velocity to the first feed velocity whereby the length of material being fed during the deceleration is determined by the difference in magnitude between the second signal and the first signal stored in the first storage means thereby feeding a preselected length of material to a utilization device in a minimum feed time.

BACKGROUND OF THE INVENTION

The present invention relates to a method and a control system for accurately feeding a preselected length of material or a workpiece to a utilization device such as a spray gun, a tube bending apparatus or a cutting apparatus. For example, it is common to utilize machines which process metal or other strip materials which are wound upon a supply roll. It becomes necessary to uncoil the metal or strip material from the supply roll and rapidly feed exact lengths of the material into the utilization machine such as a cutting apparatus or a press. Where a press or a hammer comprises the utilization machine, the material cannot be fed during the press cycle, and must only be fed when the press or hammer are in their "up" or inoperative position. Other types of cutting devices can cut a material while the material is being fed at a slow feed rate. Generally speaking, the designers of these systems are concerned with rapidly moving the material or workpiece from one point to another in a minimum amount of time. The requirements of such a feed mechanism are rapid and smooth acceleration and deceleration, accuracy of feed length and, of course, a minimum overall feed time, so that maximum production rate can be achieved. To accomplish this, the feed rate of the material or workpiece is rapidly accelerated and then decelerated prior to reaching the utilization device. The maximum rate of feed of the material is normally limited by the size of the feed motor, the speed of the utilization device and the motor response time. When feeding material from a roll, the rate of acceleration and deceleration is also limited by the slippage which occurs between the supply roll and the strip material wound thereon which is being fed to the utilization machine.

In a conventional apparatus for feeding a workpiece or a preselected length of material from point A to point B, a feed motor, upon command would accelerate at a constant rate to a preselected maximum feed velocity. The motor continues to rotate at this velocity until a fixed distance prior to the workpiece reaching point B. The motor then decelerates at a constant rate until point B is reached. The workpiece or material has thus moved from point A to point B, a fixed distance in a minimum time consistent with the preselected maximum feed velocity.

It is obvious that if the feed motor travelled at its maximum feed velocity until the workpiece actually reached point B, the target position would be overshot and it would be necessary to reverse the motor, thereby increasing the total feed time. Also, if the motor were to decelerate at too great a distance before the workpiece reached point B, minimum feed time could not be obtained either. Therefore, an important consideration in an apparatus of this type is that the feed motor decelerate from its maximum feed velocity to its initial velocity (e.g., zero velocity) in such a manner that the workpiece or material reach its desired position and the feed motor reach its initial velocity simultaneously.

Currently, there are several control systems which are available for such material feeding. Such controls normally include a means for measuring the material length being fed or the distance that the workpiece is moved and for providing a stop signal to the feed mechanism or feed drive for the supply roll. In one system, the total distance move required is stored in an electronic counter and upon command the feed motor is accelerated to its feed velocity. The counter counts down from signals received from the workpiece movement and at some predetermined count above zero the counter provides a signal to decelerate the motor to a stop. If the system is an open loop position system the position accuracy will be a function of the repeatability of the system. If the system is a closed loop position system the feed motor will continue to turn as long as there is at least typically one pulse difference between the desired position of the workpiece and the actual position of the workpiece. In any event, whether an open or closed position loop, the versatility of this system is limited when the required workpiece movement is less than the distance normally required for motor slow down. For example, assume that the slow down point for the feed motor is 10 inches from the utilization device and the actual workpiece movement total required is only five inches. Since the move is less in total than the slow down distance required, the workpiece will be moved the entire five inches at the initial slow velocity, commonly referred to as creep speed. thereby taking much longer than if the motor were actually caused to accelerate for approximately half the distance or 2½ inches and then decelerate the remaining 2½ inches.

Another system employs the count up type electronic counter which is reset to zero counts prior to the move. Upon command the motor is accelerated to its maximum feed velocity, the counter counts the feedback pulses from a digital tachometer mounted on the motor. When a preselected number of counts are accumulated, a decelerate signal is sent to motor circuitry, and the motor slows down. The motor stops when the counter accumulates a count equivalent to the total move required. A limitation of this system is that the preselected slow down point has to be changed as a function of the overall distance move required. Also, in those cases where the required distance to be moved in less than the slow down distance required, this system is inoperative.

The limitations of the above systems are overcome by the present invention.

SUMMARY OF THE INVENTION

The general purpose of this invention is to provide a method and control system for feeding a preselected length of material to a utilization device in a minimum feed time which embraces all of the advantages of similarly employed methods and control systems and possesses none of the aforedescribed limitations. To attain this, the present invention contemplates a unique control system comprising: a means for feeding the material to a utilization device; a means for accelerating and decelerating the feed means between a first feed velocity, e.g., zero velocity, and a second feed velocity, e.g., a preselected maximum feed rate; a means for generating a first signal indicative of the actual length of material being fed by the feed means; a means for generating a second signal indicative of a length of material that would be fed if the acceleration from the first feed velocity to the second feed velocity were instantaneous; a first storage means adapted to compare the first and second signals; a second storage means adapted to store the second signal; a means for generating a third signal when the difference in magnitude between the signals stored in the first storage means is equal to the amount of material which will be fed during deceleration of the feed means from the second feed velocity to the first feed velocity; switching means responsive to the third signal whereby the first signal is fed to the second storage means and whereby the second signal generating means is disconnected from the first and second storage means; and means for generating a fourth signal when the magnitude of the signals stored in the second storage means is indicative of the preselected length to be fed whereby the feed means decelerates in response to the fourth signal and the length of material being fed during deceleration is controlled by the signal stored in the first storage means thereby feeding the preselected length of material to the utilization device in a minimum time.

It is, therefore, an object of the present invention to provide a method and control system for feeding a predetermined length of material in a minimum feed time which is operative for all feed lengths.

Another object is to provide a method and control system for determining the length of material which is yet to be fed to a utilization device at any given time.

A further object is the provision of a method and control system for feeding a predetermined length of material to a utilization device which is easily adjustable to feed several different lengths.

Still another object is the provision of a method and control system for anticipating a proper slow down point of a drive feed means independent of the length of material to be fed by the drive feed means.

Yet another object is to provide a method and control system for moving a workpiece a predetermined distance in a minimum time.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
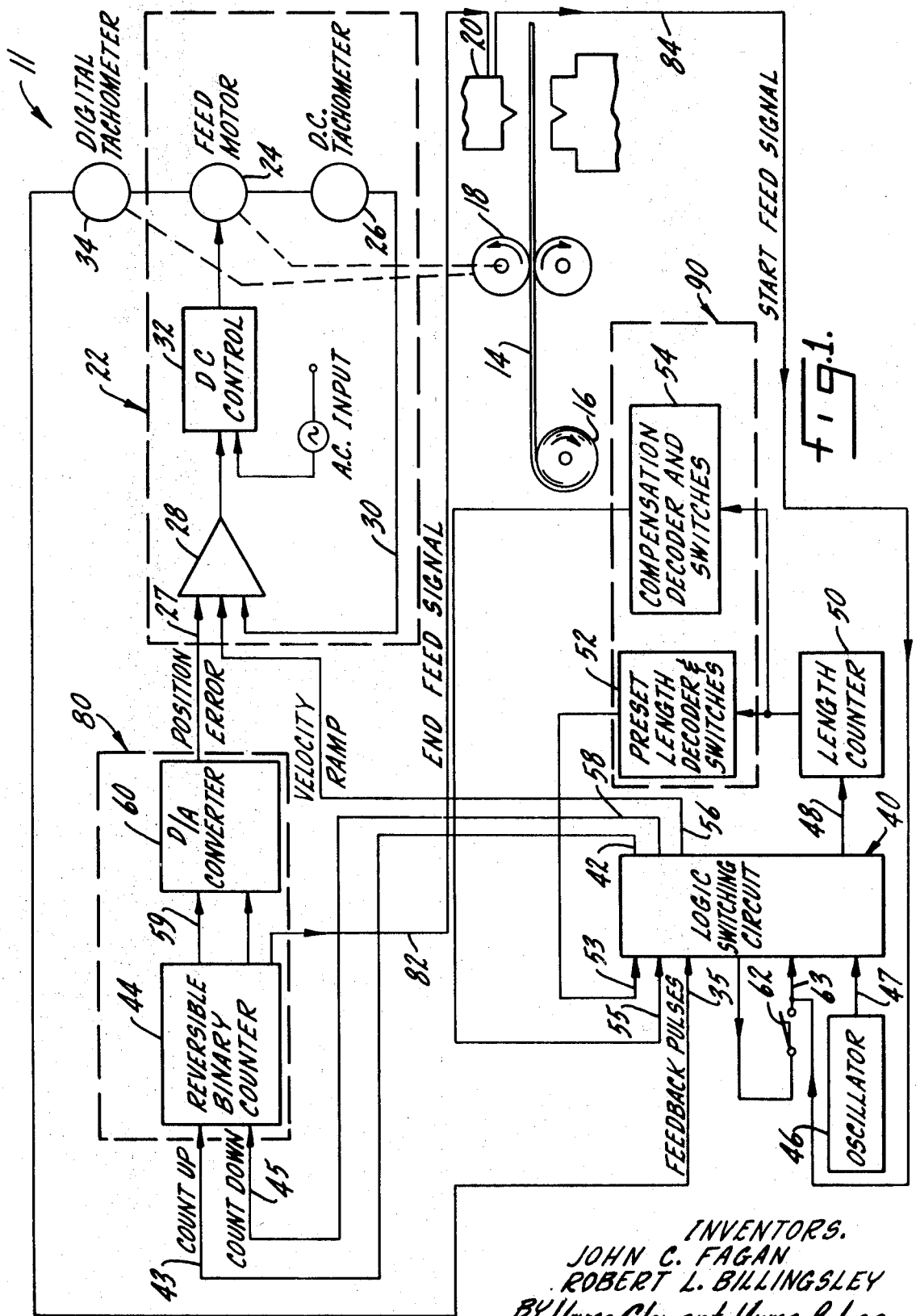
FIG. 1 is a block diagram of a preferred embodiment of the invention.

Referring now to the drawings, where like reference characters designate like or corresponding parts throughout the several views, there is shown in FIG. 1 a control system 11 for feeding a predetermined length of material to a utilization device 20 in a minimum feed time. In one preferred embodiment, a strip material 14 is coiled on a supply roll 16. A feed means 18 driven by a feed motor 24 is provided to feed the material 14 to the utilization device 20. A digital tachometer 34 is connected to the feed means 18 to continuously provide information relative to the amount of material being fed. A D.C. tachometer 26 and a ramp generator 74 (FIG. 3) are used to control the speed of the feed motor 24. An information storage circuit 80, a counter circuit 50 and a control circuit 90 store information regarding the length of material which is yet to be fed as well information to determine the ideal point or distance from the utilization device 20 at which to decelerate the feed motor 24.

Figure 2:
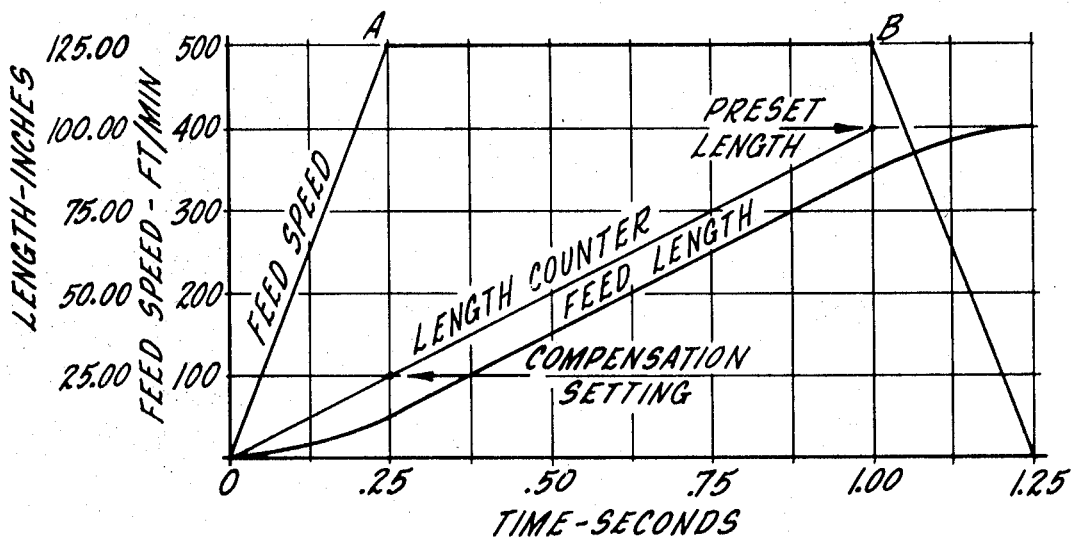
FIG. 2 is a graph depicting the operation of the apparatus shown in FIG. 1.

FIG. 2 summarizes the operation of the control system 11. Assuming that it is desired to feed exact one hundred inch lengths of material to the utilization device in a minimum feed time and stop the feed rate while the utilization device operates, it is necessary to ascertain the exact acceleration and deceleration rates for maximum efficiency. The maximum feed rate is determined by outside production parameters such as the feed motor maximum speed and the maximum cycle time of the utilization device. The example in FIG. 2 utilizes a feed motor having a maximum velocity of 500 feet per minute and the cycle time of the utilization device is 30 cycles per second. The maximum rate of acceleration and deceleration is limited by the amount of slippage in the supply roll. For example, a galvanized material must be accelerated at a slower rate than a non-galvanized material. Generally, the rate of acceleration and deceleration should be equal in order to minimize feed time.

In the example of FIG. 2, non-galvanized steel is the material to be fed. Experimentally, it was determined that the material could be accelerated at a maximum rate of 33 feet per second per second without slippage occurring. This is equivalent to 2000 feet per minute per second. Thus, it can be seen that it will require ¼ second to accelerate the material feed rate until it reaches 500 feet per minute, the maximum feed rate of the feed motor. In ¼ second, 12½ inches of material will have been fed. Therefore, as mentioned above, it is desirable to also feed 12½ inches during deceleration. Therefore, 75 inches of material is to be fed at the maximum feed rate of 500 feet per minute. Feeding of 75 inches will consume .75 second. At this point, the motor will be commanded to decelerate, and it will require ¼ second to decelerate to a stop thereby feeding exactly 12½ inches of material. The control system 11 determines the point of deceleration as well as controls the acceleration and feed rate.

Referring again to FIG. 1, the control system 11 comprises a conventional servo control system 22 which is used to drive the feed means 18. The amount of rotation of the feed means 18 is monitored by a digital tachometer 34 which provides an electrical signal in the form of pulses representative of the amount of material being fed to the utilization device 20 by the feed means 18. The signal from digital tachometer 34 is fed to a logic switching circuit 40. The logic switching circuit 40 is shown in detail in FIG. 3 and will be explained in detail below. Broadly, the logic switching circuit 40 is used to change the input signals to an information storage circuit 80 and a counter circuit 50. The logic switching circuit 40 is controlled by a compensation and length control circuit 90.

To initiate operation of the control system 11, it is necessary to determine the length of material to be fed. This information is placed into the compensation and length control circuit 90. Also, a compensation setting is required.

The compensation setting is a function of the amount of material which is to be fed during deceleration of the feed means. In an ideal situation, when the rate of acceleration equals the rate of deceleration, the compensation setting is approximately twice the amount of material to be fed during acceleration.

After this information is stored in the compensation and length control circuit 90, an operator closes a switch, schematically shown as switch 62, which provides a start pulse to the logic switching circuit 40. A ramp generator 74 (FIG. 3) in the logic switching circuit 40 begins to accelerate the feed motor 24 of the servo control system 22. The voltage of the ramp generator 74 is preset to conform to the maximum rate of acceleration desired and is not controlled by the operator.

An oscillator 46 is also connected to the logic switching circuit 40. The signal from the oscillator 46 is adjusted to represent a theoretical amount of material being fed to the utilization device 20. These signals generated by the oscillator 46 are indicative of the theoretical length of material that would have been fed if the feed motor 24 had accelerated instantaneously from zero to its maximum steady state feed velocity.

As mentioned above, the digital tachometer 34 provides a signal indicative of the actual amount of material being fed to the utilization device 20. It can be seen that the material actually being fed by the feed means 18 during acceleration is less than the material that would have been fed if the feed motor 24 had accelerated instantaneously to its maximum steady state velocity.

The signals from the digital tachometer 34 and the oscillator 46 are fed via leads 58 and 42, respectively, to the information storage circuit 80 where they are compared and stored. It can be seen that the stored signal is therefore representative of the additional amount of material which would have been fed had the feed motor 24 accelerated instantaneously.

The oscillator signal is also fed via lead 48 to a second memory circuit, length counter 50. The length counter 50 continues accumulating pulses from the oscillator 46 until the number of pulses stored equals the compensation setting stored in the compensation decoder and switches 54 (25 inches in the example shown in FIG. 2), an output signal is produced by the compensation decoder and switches 54 which is transmitted via lead 55 to the logic switching circuit 40. The generation of this signal indicates that the difference in the oscillator and digital tachometer signals stored in the information storage circuit 80 is equal to the length of material that will be fed during deceleration (12½ inches in the example shown in FIG. 2).

This signal from the compensation decoder and switches 54 causes the oscillator 46 to be disconnected from the logic switching circuit 40 and also causes the signal from the digital tachometer 34 to be switched to the input of the length counter 50. Length counter 50 continues to accumulate pulses. The stored information is greater than the actual amount of material that has been fed by an amount equal to the value stored in the information storage circuit 80. When the signal stored in the length counter 50 equals the information stored in the preset length decoder and switches 52 (100 inches in the example shown in FIG. 2) a signal is generated by the preset length decoder and switches 52. This signal is transmitted via lead 53 to the logic switching circuit 40. Logic switching circuit 40 then causes the ramp generator 74 to begin to decrease to zero voltage thus decelerating the feed motor 24. During this deceleration, the signal stored in the information storage circuit 80 controls the amount of material being fed during deceleration (12½ inches in the example shown in FIG. 2), thereby feeding the preselected length of material to the utilization device 20 (100 inches in the example shown in FIG. 2).

When the signal stored in the information storage circuit 80 reaches zero, another signal is generated via lead 82 which represents the end of feed of material. This signal may then energize a solenoid (not shown) and cause the utilization device 20 to operate. After the utilization device 20 has operated, a signal is generated by any conventional circuit means (not shown) and is fed via lead 84 to the input of logic switching circuit 40. This signal acts as a start feed signal in the same manner as the closure of the switch 62 by the operator. After receiving the signal from the utilization device, the logic switching circuit again begins to accelerate the feed motor 24 as described above.

Figure 3:
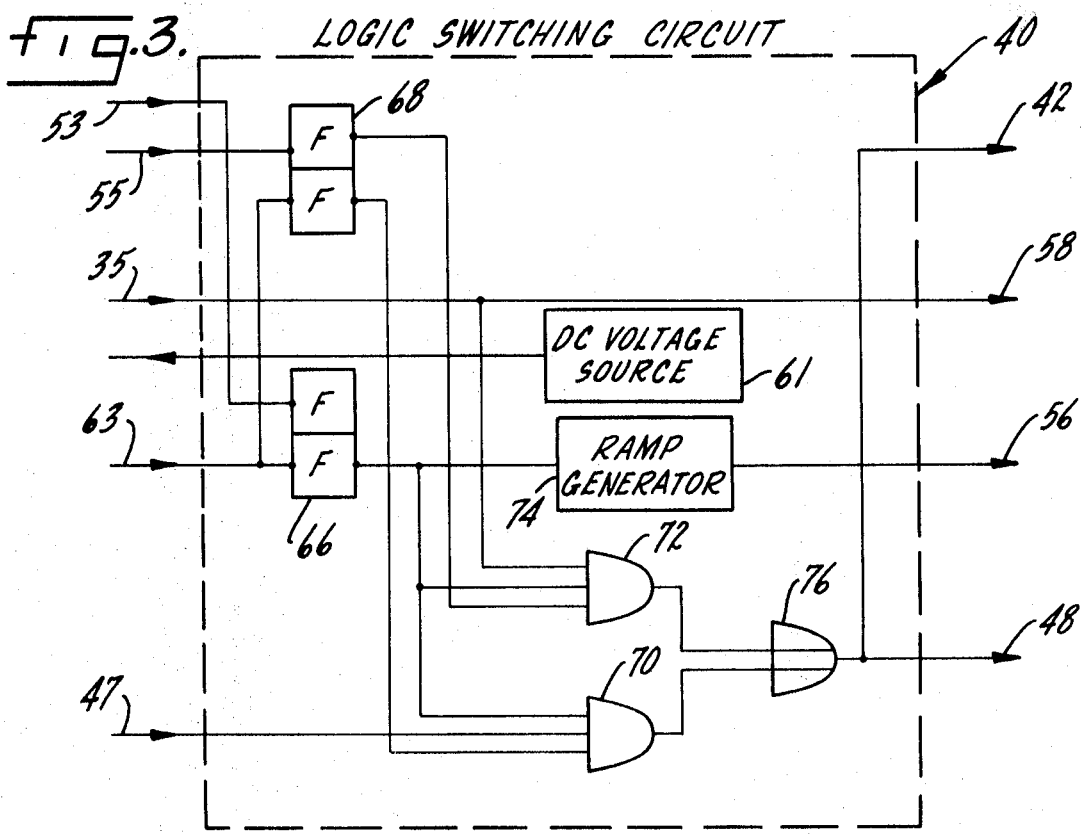
FIG. 3 is a schematic diagram of the logic switching circuit shown in FIG. 1.

Now referring to FIG. 3 in conjunction with FIG. 1, the operation of the control system 11 will be described in greater detail. In one preferred embodiment, the information storage circuit 80 may comprise a reversible binary counter 44 connected to a digital to analogue converter 60. The compensation and length control circuit 90 may comprise a preset length and decoder switches 52 and a compensation decoder and switches 54. The preset length and decoder switches 52 and the compensation decoder and switches 54 may in the preferred embodiment comprise a group of rotary switches.

Both the reversible binary counter 44 and the digital to analogue converter 60 are conventional components and may be readily purchased as "off-the-shelf" items. One particular binary counter and one particular digital to analogue converter are fully disclosed in an instruction manual published in December of 1969 by Amtron, Inc. entitled, "Instruction Manual For Error Register-D/A Converter, Model No. ERDA 224–0". Likewise, the length counter 50, the preset length decoder and switches 52 and the compensation decoder and switches 54 are also conventional "off-the-shelf" items. One particular form of each of these components is fully disclosed in an instruction manual published by Amtron, Inc. of Midlothian, Ill., in December of 1969, entitled, "Instruction Manual For Preset Length and Speed Control, Model No. SPLS–5RO–231–0." It will be readily recognized by one skilled in the art that while specific "off-the-shelf" components have been disclosed and referred to, any similar components may be utilized without departing from the spirit and the scope of the invention.

As mentioned above, the frequency of the oscillator 46 is set to be equal to the rate of feed at steady state velocity. For example, if the steady state rate of feed were chosen to be 500 feet per minute and if the diameter of feed rollers were 7.639 inches, the oscillator frequency would be set at 10 kHz. since this would equal the pulse rate of the digital tachometer 34 when the feed rollers 18 were feeding material at 500 feet per minute or 100 inches per second. The rate of acceleration and deceleration are then determined based upon the maximum feed rate and the material being fed, as described above and the desired length to be fed is set on the preset length and decoder switches 52. The compensation and decoder switches 54 are also set, as indicated above. The rate of acceleration and deceleration need not be the same (as in the example) since the oscillator frequency and setting on the compensation decoder and switches 54 can both be adjusted to account for any differences. Ideally, however, it is best to have equal rate of acceleration and deceleration; however, in practice, the deceleration rate may be different than the acceleration rate and this must be compensated for in the compensation setting. The compensation setting is approximately twice the length of material fed ring acceleration, i.e., before the feed motor 24 reaches steady state.

The control system 11 actually operates through five distinct phases. When start switch 62 is closed by the operator, a DC voltage is applied to an input 63 of the control logic circuit 40. Referring to FIG. 3 in conjunction with FIG. 1, this causes the oscillator 46 to be connected through an AND gate 70 and an OR gate 76 of the control logic circuit 40 to the up terminal 43 of the binary counter 44. At the same time, the oscillator 46 is also connected through an AND gate 70 and an OR gate 76 of the control logic circuit 40 to the length counter 50.

When a signal is placed on the input lead 63 of the control logic circuit 40, the flip-flop circuit 66 and a second flip-flop circuit 68 are set, thereby providing input signals to the AND gate 70 and an AND gate 72. Thus, the oscillator pulses on lead 47 are transmitted through the AND gate 70 to the OR gate 76 to the output leads 42 and 48 which are respectively connected to the binary counter 44 and the length counter 50. At this time, with the oscillator 46 connected to the up terminal 43 of the binary counter 44, the output 59 of the binary counter 44 is connected to the input 59 of the digital-to-analogue converter 60 whose output 27 is connected to an input of the servo control system 22. The output of the servo control system 22 is monitored by a DC tachometer 26 which provides a feedback signal to a servo amplifier 28 via a feedback path 30. The output of the servo amplifier 28 is fed to a DC control circuit 32 which provides armature current in the form of a pulsating direct current to the armature of feed motor 24. The DC control 32 may comprise a conventional motor control circuit. One such circuit is manufactured by the General Electric Company and is known as a Silicon Six Reversing Three Phase Drive System. It will, however, be recognized by one skilled in the art that any conventional motor speed control system may be utilized.

A ramp generator 74 is also connected to the input of the servo control system 22. The voltage of the ramp generator is adjusted so that the feed motor 24 will accelerate at its maximum preselected acceleration rate. As the start signal is applied to the input of the logic switching circuit 40, the ramp generator 74 generates a linearly increasing voltage signal which controls the actual acceleration of the feed motor 24 through the servo control system 22. The feed motor 24 begins to accelerate thereby causing feed rollers 18 to turn and begin feeding the material 14 to the utilization device 20.

In one preferred embodiment, the control logic circuitry may further include a built-in delay means so that after the start feed switch 62 is initially closed, the binary counter 44 would begin counting prior to the initiation of the signal from the ramp generator 74. This delay may be variable and further aids in the initial acceleration of the feed motor 24. When the ramp signal is not present, the acceleration of the feed motor 24 would initially be controlled by the output of the digital to analogue converter 60 as well as the feedback signal from the DC tachometer 26. This would necessarily entail a slow acceleration and would prevent slipping from the supply roll which would eventually materialize into measurement errors. Finally, after this delay caused by the delay means the ramp signal from the ramp generator 74 is applied to the input of the servo amplifier 28 and the feed motor 24 begins to accelerate rapidly to the maximum desired steady state feed rate.

The digital tachometer 34 monitors the angle of rotation of the feed rollers 18 and provides a signal to the input of the logic switching circuit 40 via lead 35 and eventually to the "down" terminal 45 of the binary counter 44. Thus, the digital tachometer 34 provides a signal which is indicative of the amount of material actually being fed to the utilization device 20 by the feed means 18.

The oscillator 46 is also providing signals to the binary counter 44 through the logic switching circuit 40. As explained above, the signal from the oscillator 46 is adjusted to represent a theoretical amount of material being fed to the utilization device 20 and is indicative of the length of material that would have been fed had the feed motor 24 accelerated instantaneously from zero to its maximum steady state feed velocity. Thus, the binary counter 44 will produce a positive output since the "up" signal on the lead 43, i.e., the signal from the oscillator 46, runs ahead of the down signal on the lead 45, i.e., the signal from the output of the digital tachometer 34, since the digital tachometer signal represents the amount of material actually being fed. This positive signal from the binary counter 44 is fed to the digital to analogue converter 60 via the lead 59.

The digital to analogue converter 60 is adjusted so that it saturates when the output from the binary counter 44 reaches a preset value. In the example shown in FIG. 2, 100 counts have been established at the saturation value since, in this embodiment, 100 pulses from the oscillator or, i.e., 100 counts, has been chosen to represent one-inch of material being fed to the utilization device 20. This correlation is determined solely by the circumference of the supply roll 16 (i.e., 7.639 inches) and by the pulses per revolution of the digital tachometer 34. This terminates phase I of the operation.

In summary, the binary counter 44 is storing a signal which represents the difference between the digital tachometer signal, i.e., the actual length of material being fed, and the oscillator signal, i.e., the amount of material that would have been fed during the acceleration period had the feed motor 24 instantaneously accelerated from zero velocity to its maximum steady state velocity. The length counter 50 during phase I is only storing the signal from the oscillator 46 or the signal which represents the amount of material that would have been fed had the feed motor 24 accelerated instantaneously to its maximum steady state velocity rather than having been accelerating from zero to its maximum velocity for a definite time.

Phase II is similar to phase I except that the output from the digital to analogue converter has been saturated, thus providing a constant signal to the input of the servo amplifier 28. During phase II, the length counter 50 continues to count the pulses from the oscillator 46. When the length counter 50 accumulates a number of pulses which are equivalent to the setting on the compensation decoder and switches 54, an output signal occurs from the compensation decoder and switches 54 which is transmitted back via a lead 55 to the control logic circuit 40. This signal causes the flip-flop circuit 68 to reset, thereby applying a signal to the input of the AND gate 72 and removing the signal from the input to the AND gate 70. Thus, the oscillator 46 is disconnected from the input to the length counter 48 and the output from the digital tachometer 34 is applied through the AND gate 72 to the length counter 50. When the feed motor 24 reaches steady state velocity, phase II terminates.

It can thus be seen that when phase II ends, the signal being stored by the length counter 50 is no longer a signal representative of a theoretical length value and the length counter 50 now receives a signal which is representative of the actual length of material being fed while the feed motor 24 is at steady state velocity.

It should be noted that the binary counter 44 now contains a count equal to that by which the length counter 50 is ahead of the actual amount of material that has been fed. In practice, the compensation decoder and switches 54 are set to such a length so that the amount that the signal stored in the length counter 50 is ahead at the beginning of phase III is exactly the amount of material which will be fed while the motor is eventually slowing down to zero velocity at the end of the feed cycle. If the deceleration time and acceleration time requirements of the control system 11 are not identical to each other it can be seen that if we vary the freqeuncy of the oscillator 46 or the setting of the compensation switches 54 we would store a number in the reversible binary counter 44 which represents the difference between the actual material fed and the theoretical material fed. Because the amount of difference between the length counter reading and the actual material that has been fed is actually stored in the binary counter 44, the system never loses track of the actual amount of material being fed and the amount yet to be fed.

As phase III begins, the state of the binary counter 44 does not change since the up-count on the input 43 now effectively equals the down-count on the input 45 since the output from the digital tachometer 34 is being supplied to both the up terminal 43 and the down terminal 45 through the logic switching circuit 40. Alternatively, it will be recognized by one skilled in the art that rather than applying the same signal to both the up and the down counter, one could inhibit the input signal to the binary counter 44 rather than applying similar signals to both the "up" input 43 and the "down" input 45. The output of the digital to analogue converter 60 is at a fixed voltage output due to the saturation of the digital to analogue converter 60. The length counter 50 during phase III continues to count up due to the signal being applied by the digital tachometer 34 until such a time as the length counter 50 has accumulated a count which is equal to the count set in the preset length decoder and switches 52 (which contains a setting equal to the desired predetermined length of material which is to be fed into the utilization device 20). When the counts stored in the length counter 50 equal the setting of the preset length and decoder switches 52, the length counter 50 actually contains a total number of counts in excess of the actual amount of material which has been fed to the utilization device 20. This excess is caused by the fact that during phase I, the input to the length counter 50 was from the oscillator 46 rather than from the digital tachometer 34 and therefore, this input did not coincide with the actual amount of material being fed but was in excess thereof. (This terminates phase III and commences phase IV.)

After the preset number has been reached by the length counter 50, an output signal is generated by the preset length and decoder switches 52 which is then fed via lead 53 to the logic switching circuit 40. This causes the flip-flop circuit 66 to reset, thereby inhibiting any further count signals to the length counter 50 and to the "up" terminal 43 of the binary counter 44. The resetting of the flip-flip circuit 66 also causes the voltage output from the ramp generator 74 to begin decelerating to zero voltage at a constant linear rate. Typically, this rate of deceleration is adjusted so that the voltage from the ramp generator decreases from the maximum voltage signal to zero volts in .3 second linearly. This linear deceleration of the ramp generator voltage causes the feed motor 24 to decelerate. During this deceleration, the binary counter 44 is now counting down from the digital tachometer 34. It is to be noted that a signal representative of the actual length of material that still has to be fed to the utilization device 20 is stored in the binary counter 44 which is counting down as the feed motor 24 decelerates under the direction of the ramp generator 74's command. As the count in the binary counter 44 decreases to the saturation value of the digital to analogue converter 60 (i.e., 100 counts), phase IV of the operation is terminated.

Phase V begins when the output of the digital to analogue converter 60 starts decreasing since it is now below its saturation value. When the output of the digital to analogue converter 60 reaches zero, the feed motor 24 stops. The output from the binary counter 44 and the digital to analogue converter 60 during phase V controls the deceleration of the feed motor 24 so that an amount of material 14 is fed to the utilization device 20 which compensates for the slow feed rate during the acceleration. In practice, the control system 11 is so adjusted that the signal from the ramp generator 74 reaches zero volts when the count in binary counter 44 is typically about 25 counts or representative of a quarter of an inch of material. This is so adjusted so as to minimize the overshoot that might occur if the output from the digital to analogue converter 60 reaches zero at the exact time that the ramp generator reaches zero. As the binary counter 44 reaches zero counts stored therein, a signal is generated via lead 82 which indicates the end of feed and which may energize a solenoid to initiate the operation of the utilization device 20. After the utilization device has completed its operation, a signal is generated which is fed to the logic switching circuit via lead 84. This signal initiates another feed cycle and phases I through V are again repeated.

While the preferred embodiment has been described in relation to a "feed to stop" material feed system operating between zero velocity and a maximum feed velocity, it will be recognized by one skilled in the art that the initial and final feed velocity need not be zero and that the control system 11 may operate between a first feed velocity and a second steady state feed velocity so as to control the length of feed of a continually moving conveyor belt. It will be recognized that control system 11 may also be used to feed a workpiece between two preselected points in a minimum time.

It should be understood, of course, that the foregoing disclosure relates only to a preferred embodiment of the invention and that numerous modifications or alterations may be made therein without departing from the spirit and the scope of the invention as set forth in the appended claims.

What is claimed is:

1. A control system for feeding a preselected length of material in a minimum feed time comprising:
    means for feeding said material;
    means for accelerating and decelerating said feed means between a first feed velocity and a second feed velocity;
    means for generating a first signal indicative of the actual length of material being fed by said feed means;
    means for generating a second signal indicative of a length of material that would be fed if said acceleration from said first feed velocity to said second feed veolcity were instantaneous;
    first storage means adapted to compare said first and second signals;
    second storage means adapted to store said second signal;
    means for generating a third signal when said difference in magnitude between said signals stored in said first storage means is equal to the amount of material which will be fed during deceleration of said feed means;
    switching means responsive to said third signal whereby said first signal is fed to said second storage means and whereby said second signal generating means is disconnected from said first and second storage means; and
    means for generating a fourth signal when said magnitude of said signals stored in said second storage means is indicative of said preselected length to be fed whereby said feed means decelerates in response to said fourth signal and said length of material to be fed during said deceleration is controlled by said signal stored in said first storage means thereby feeding said preselected length in said minimum time.

2. The control system of claim 1 wherein said first feed velocity is initially zero and wherein said second feed velocity is representative of a maximum steady state feed velocity.

3. The control system of claim 2 wherein said rate of feed deceleration is approximately equal to said rate of feed acceleration.

4. The control system of claim 1 wherein said means for accelerating and decelerating said feed means comprises a ramp generator means.

5. The control system of claim 4 wherein said means for accelerating and decelerating means further comprises a delay means wherein feed means accelerates prior to the application of a signal from said ramp generator means.

6. The control system of claim 1 wherein said means for generating said first signal comprises a digital tachometer.

7. The control system of claim 1 wherein said means for generating said second signal comprises an oscillator means.

8. The control system of claim 1 wherein said first storage means comprises a first counter means.

9. The control system of claim 1 wherein said second storage means comprises a second counter means.

10. The control system of claim 1 wherein said means for generating said third and fourth signals each comprise a digital decoder means.

11. A method for feeding a preselected length of material in a minimum feed time comprising the steps of:
accelerating the feed rate of said material from an initial first feed velocity to a second feed velocity;
continually providing a first signal representative of the actual length of said material being fed;
providing a second signal during said acceleration wherein said second signal is indicative of the length of material that would have been fed during said acceleration if said feed rate had accelerated from said first feed velocity to said second feed velocity instantaneously;
comparing said first and second signals until said difference in magnitude between said first and second signals is indicative of the amount of material which will be fed during deceleration of the feed means from said second feed velocity to said first feed velocity;
adding said first signal to said previously provided second signal; and
decelerating said feed rate from said second feed velocity to said first feed velocity when the magnitude of said added signals is equal to said preselected length of material thereby feeding a preselected length of material in a minmium feed time.

12. A method for feeding a preselected length of material in a minimum feed time comprising the steps of:
accelerating the feed rate of said material from an initial first feed velocity to a second feed velocity;
providing a first signal to a first storage means wherein said first signal is indicative of the actual length of said material being fed;
providing a second signal during said acceleration to said first storage means and to a second storage means wherein said second signal is indicative of the total length of material that would have been fed during said acceleration of said feed rate had accelerated from said first feed velocity to said second feed velocity instantaneously;
disconnecting said second signal from said first and second storage means and applying said first signal to said second storage means when the difference in magnitude of said first and second signals stored in said first storage means is equal to the additional amount of material which would have been fed if said feed rate had accelerated from said first feed velocity to said second feed velocity instantaneously, wherein said second storage means adds said first signal to said previously provided second signal until the total magnitude of said signals stored in said second storage means is indicative of said preselected length to be fed; and
decelerating said feed rate from said second feed velocity to said first feed velocity whereby said length of material being fed during said deceleration is determined by the difference in magnitude between said second signal and said first signal stored in said first storage means thereby feeding a preselected length of material in a minimum feed time.

13. The method of claim 12 wherein said initial first feed velocity is zero and wherein said second feed velocity is representative of a maximum steady state feed velocity.

14. The method of claim 13 wherein said rate of deceleration is approximately equal to said rate of acceleration.

15. A control system for feeding a preselected length of material in a minimum feed time comprising:
means for feeding said material;
means for accelerating said feed means wherein the feed rate of said feed means is adapted to accelerate from a first feed velocity to a second feed velocity;
means for genearting a first signal indicative of the actual length of said material being fed by said feed means;
means for generating a second signal during said acceleration wherein said second signal is indicative of the length of material that would be fed if said acceleration from said first feed velocity to said second feed velocity were instantaneous;
first means adapted to compare said first and second signals during said acceleration whereby the difference in magnitude between said first and second signals is stored by said first means;
second means adapted to store said second signals during said acceleration;
first control means adapted to enable said first signal to be stored by said second storage means when said feed rate reaches said second velocity and wherein said second storage means adds first signal to said second signal until the magnitude of said stored signal is indicative of said preselected length to be fed; and
second control means adapted to decelerate said feed means from said second feed velocity to said first feed velocity wherein said length of material being fed during said deceleration is controlled by said stored signal in said first means thereby feeding a preselected length of material in a minimum feed time.

16. A method for feeding a preselected length of material in a minimum feed time comprising the steps of:
accelerating the feed rate of said material from a first feed velocity to a second feed velocity;
providing a first signal indicative of the actual length of said material being fed;
providing a second signal during said acceleration wherein said signal is indicative of the length of material that would be fed if said acceleration from said first feed velocity to said second feed velocity were instantaneous; and
decelerating said feed rate from said second feed velocity to said first feed velocity when the total magnitude of said first signal and said second signal equals said preselected length of material thereby feeding a predetermined length of material in a minimum feed time.

References Cited

UNITED STATES PATENTS

| | | | |
|---|---|---|---|
| 3,248,029 | 4/1966 | Money | 226—122X |
| 3,362,601 | 1/1968 | Ford et al. | 226—122 |
| 3,452,853 | 7/1969 | Mabon | 226—122 |
| 3,482,229 | 12/1969 | Burr | 226—122X |

ALLEN N. KNOWLES, Primary Examiner

U.S. Cl. X.R.

226—8, 122